United States Patent [19]

Hoshino

[11] Patent Number: 5,219,449
[45] Date of Patent: Jun. 15, 1993

[54] PIPE CONNECTOR

[75] Inventor: Yoshiki Hoshino, Aichi, Japan

[73] Assignee: Hoshino Gakki Co., Ltd., Japan

[21] Appl. No.: 887,771

[22] Filed: May 22, 1992

[30] Foreign Application Priority Data

Oct. 16, 1991 [JP] Japan .............................. 3-093250[U]

[51] Int. Cl.⁵ .................................................. F16B 7/00
[52] U.S. Cl. ........................................ 403/297; 403/292
[58] Field of Search ................................... 403/297, 292

[56] References Cited

U.S. PATENT DOCUMENTS

| | | | |
|---|---|---|---|
| 2,657,944 | 11/1953 | Miller | 403/297 |
| 3,342,511 | 9/1967 | Galloway | 403/297 X |
| 5,102,254 | 4/1992 | Yeh | 403/297 X |

FOREIGN PATENT DOCUMENTS 1097534  1/1968  United Kingdom ................ 403/297
2106212  4/1983  United Kingdom ................ 403/297

Primary Examiner—Andrew V. Kundrat
Attorney, Agent, or Firm—Ostrolenk, Faber, Gerb & Soffen

[57] ABSTRACT

A connector for connecting the open terminal ends of two pipes. The connector includes a first and a second generally half circular partial bush each having an end which extends into one of the pipe terminal ends. A bolt tightened through one partial bush presses against the facing abuttable surface of the other partial bush to press the other partial bush outwardly causing the partial bushes to frictionally engage in the pipe ends. The bolt preferably extends non-radially along a chord of the circle defined by the bushes. Protrusions axially spaced from the bolt at the facing surfaces of the partial bushes helps distribute the pressing force of the partial bushes to both pipe terminal ends.

16 Claims, 6 Drawing Sheets

PIPE CONNECTOR

BACKGROUND OF THE INVENTION

The present invention relates to a pipe connector and particularly a pipe connector which is secured in and between the ends of two adjacent pipes by force clamping.

Some structures are assembled by connecting a plurality of pipes, e.g. a fence around a building, a stand for display or for fixing of illumination, shelves, household furniture, etc.

Examples of known pipe connectors are shown in FIGS. 9 and 10.

In FIG. 9 the pipe connector comprises a pipe P1 which has an installation hole H1 through which a first stopping bolt B1 is inserted and pipe P2 which has an installation hole H2 through which a second stopping bolt B2 is inserted. The pipes P1 and P2 are connected together through a connecting bush 90. The stopping bolts B1 and B2 are screwed radially into the connecting bush 90 into screw holes 91 from outside the respective pipes P1 and P2, thereby tightly fixing the connecting bush and the pipes together.

The pipe connector in FIG. 10 includes a connecting bush 92 connected to the ends of the pipes P3 and P4. Grooves 93 are provided in the ends of the bush 92 and extend in its longitudinal direction. Holding plates 94 are inserted into the grooves 93. By pressing the holding plates 94 radially from outside the pipe P3 and P4, by means of respective tightened bolts B3 and B4, the pipes P3 and P4 are fixed to the bush 92. Installation holes 95 extends radially through the pipes and into the bush 92 and screw holes 96 are formed in the connecting bush to receive the screws B3 and B4.

While the structure of FIG. 9 is simple, the outer surface of the pipes, posing a pro their appearance and obstructing the clamping of other pipes. The structure of FIG. 10, on the other hand, is somewhat complicated even though the possible protrusion of the bolts through the outer surface of the pipes can be prevented by installation using a bolt having a head with a hexagonal hole for receiving an Allen wrench.

These two known connecting structures, require that holes be form in the pipes through which the bolts are to be inserted, complicating the required assembly steps. Moreover, since each pipe is fixed by a single bolt, it lacks stability against subsequent bending or twisting.

SUMMARY OF THE INVENTION

The present invention concerns a pipe connector, which firmly connects two pipes and holds them against external forces, for example, bending or twisting. The outside appearance and structure of the pipe connector are simple, enabling easy installation and dismantling.

The pipe connector comprises a first and a second partially circumferential, and preferably semicylindrical, partial connecting bushes. The two bushes are placed next to each other longitudinally to define a complete circumference. The partial bushes are inserted into both of the ends or terminal regions of the pipes, which regions are located at both ends of the partial bushes. A tightening bolt runs through the first partial bush generally at the axial centers of both of the partial bushes. The bolt in the first partial bush presses against the second partial connecting bush generally in the circumferential direction of the pipe. This biases the two partial bushes apart and presses their outer surfaces against the insides of the pipe terminal end regions. No holes need to be formed in the pipe end regions to receive any connecting bolts.

Other objects and features of the present invention will become apparent from the following description of the invention which refers to the accompanying drawings.

DETAILED DESCRIPTION OF THE PREFERRED EMBODIMENT

Figure 1:
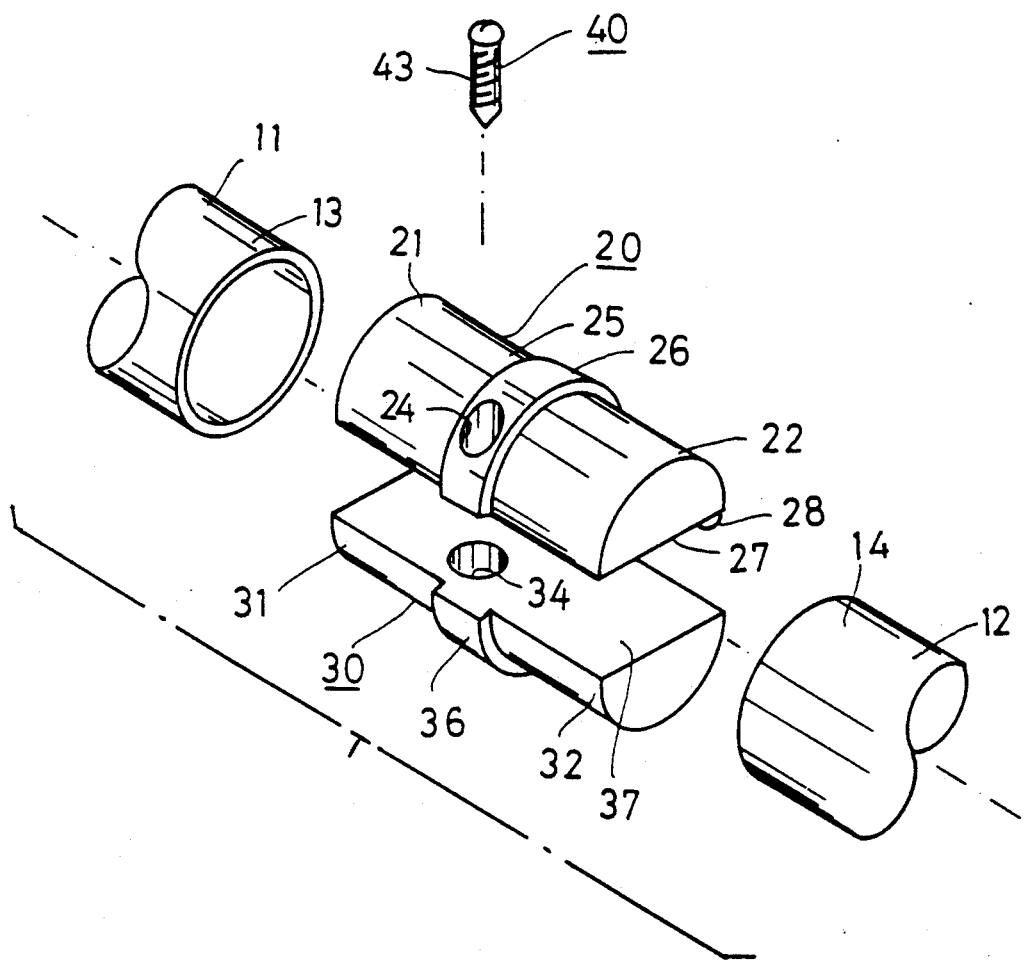
FIG. 1 is a perspective view of an example of the pipe connector according to the present invention.
Figure 4:
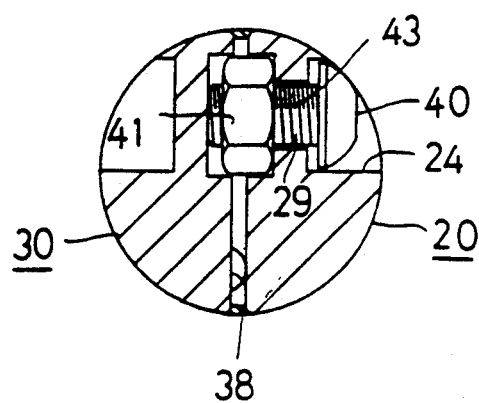
FIG. 4 is a cross-sectional view along line 4—4 in FIG. 2.

In the embodiment of the invention shown in FIGS. 1 and 4, the pipe connector according to the present invention comprises a first partial connecting bush 20, a second partial connecting bush 30 and a tightening bolt 40. Both ends of both of the first partial connecting bush 20 and the second partial connecting bush 30 are inserted into the respective longitudinally spaced apart terminals end regions 13 and 14 of the pipes 11 and 12 to be connected.

The first partial connecting bush 20 comprises a main bush body 25 which extends over less than a complete bush circumference and particularly is in a semicircular, half cylindrical, columnar shape.

The partial bush 20 includes a radially thickened, partial annular flange 26 projecting radially outward from it peripheral surface at its axial center. The partial annular flange 26 has a radial height which is approximately the same as the outer diameter of the adjacent terminal end regions of the pipes to be connected.

A bolt hole 24 in the flange 26 receives an inserted tightening bolt 40, described below, at a position and orientation which makes the bolt extend not radially, but along a chord of the complete bush. That is, the bolt is unevenly located around the circumference of the main bush body, i.e. the hole is along a chord of the complete annular flange. The inner peripheral surface of the bolt hole 24 includes a narrow region 29, shown in FIG. 3, sized for only the shaft portion 43 of the tightening bolt 40 to pass therethrough.

The second partial connecting bush 30 has a main partial bush body 35 which is complementary in partial circumferential shape to the first partial bush 20, i.e. it is in an approximately semicircular, cylindrical, columnar shape. The body 35 has a partial annular flange 36 projecting radially out from its peripheral surface at its axial center. In the second partial connecting bush 30, a bolt receiving blind hole 34 is formed at a circumferential and off center location which corresponds to the exit from the bolt hole 24 of the first partial bush 20 and at the joint or normally abuttable surface 37 which faces the other partial bush and is between the body 35 and the body of the first partial connecting bush 20.

Figure 3:
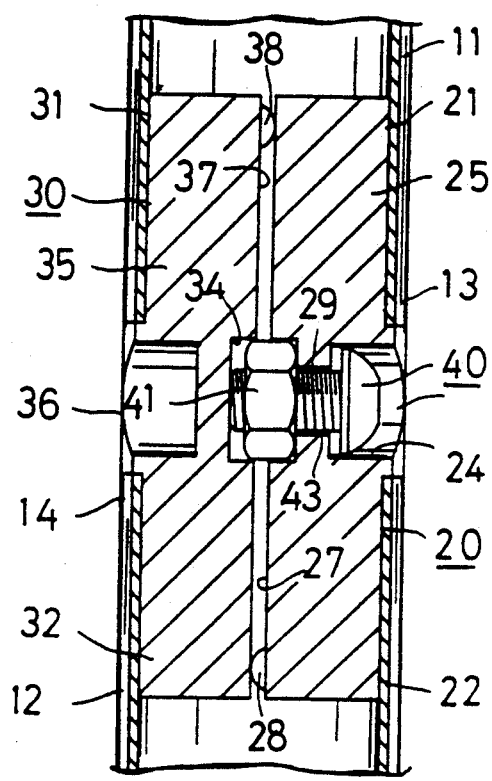
FIG. 3 is a cross-sectional view along line 3—3 in FIG. 2.

Tightening bolt 40 is tightened through the bolt hole 24 of the first partial bush 20 and is installed in the first partial bush 20. The bolt 40 is held in place, above the abuttable facing surface of the first bush 20 and extends toward the abuttable facing surface of the second partial connecting bush 30. The bolt 40 is supported in the partial bush 20 by a large head nut 41 which is installed on the inner end of the bolt shank. As can be seen in FIG. 3, there is a wide countersink in the abuttable facing surface of the first partial bush and a corresponding countersink in the abuttable facing surface of the second partial bush. Both countersinks accommodate the nut 41.

Tightening of the tightening bolt 40 causes the axial end of the shank 43 of the bolt 40 to press on the bolt receiving part 34 of the second partial bush 30 generally in the circumferential direction of the pipe. This pushes the normally abuttable facing surfaces 27 and 37 of both of the partial connecting bushes 20 and 30 apart inside the pipes 11 and 12, thereby firmly frictionally connecting the end of the shank pipes 11 and 12.

Figure 2:
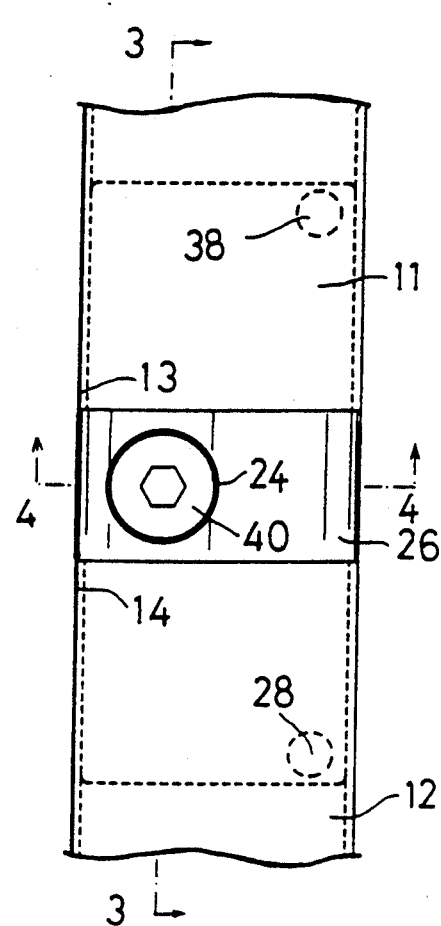
FIG. 2 is a top view of the assembled pipe connector and pipes.

In FIGS. 2 and 4, the bolt hole 24 extending through the first partial connecting bush 20 is formed somewhat off the radius and toward the exterior from the center of the flange part 26.

A first protrusion 28 is provided toward the axial terminal end of the abuttable facing surface of the second partial connecting bush 30, and the protrusion is at an axial location that is farthest from the bolt through hole 24. In FIG. 1, it can be seen that the protrusion 28 is also off toward the peripheral exterior at the side away from the hole 24.

Another protrusion 38 is formed at an axial location which is opposite and away from the first protrusion 28 and at the abuttable facing surface 37 of the second partial connecting bush 30 with the first partial connecting bush 20.

Each protrusion 28 and 38 is axially far enough toward its respective end of its partial bush as to be inside the respective pipe terminal end regions when the partial bushes are installed in the pipes.

In this example, the force which is produced by tightening of the bolt 40 and which presses on the second partial bush 30 is diffused over three points of contact, the bolt axis 43 and the two protrusions 28 and 38, which are inside the pipe terminal ends. As shown in FIG. 3, the protrusions 28 and 38 abut against the surface of the opposing partial bush and thus maintain a spacing between the partial bushes 20, 30 at their ends. This, keeps the partial bushes pressed against the pipes at both ends. Accordingly, the pipes 11 and 12 can be accurately held and connected more firmly.

Figure 5:
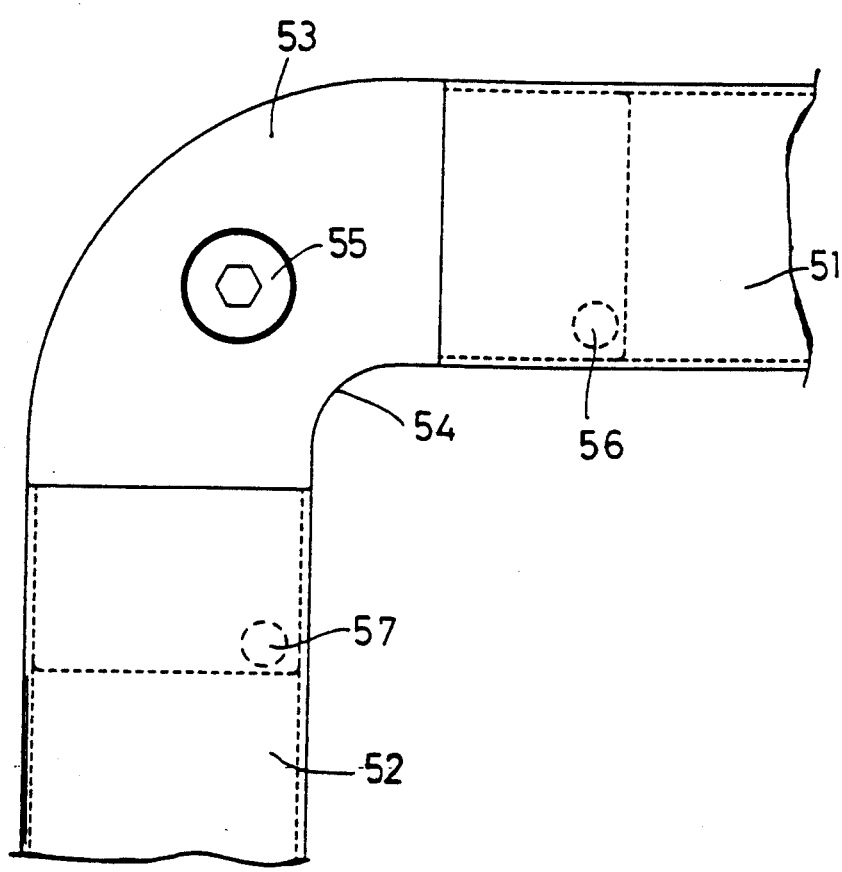
FIG. 5 illustrates another embodiment of the pipe connector of the present invention.

The connecting bush can be formed to extend straight in the longitudinal direction of the pipes or also to be bent at any given angle, and the pipes can be firmly connected at any bend angle. FIG. 5 is an embodiment where two pipes are connected at a bend angle of 90°. Here pipes 51 and 52 are connected by the first partial connecting bush 53 and the second partial connecting bush 54 by the tightening bolt 55. The uniform spreading apart of the partial bushes is aided by the protrusions 56 and 57, which are like the protrusions 28 and 38 and are inside the respective pipe terminal end regions. The force pressing out on the pipes is diffused over the tightening bolt 55 and over the protrusions 56 and 57 for firmly holding the pipes 51 and 52 against possible twisting and bending.

Figure 6:
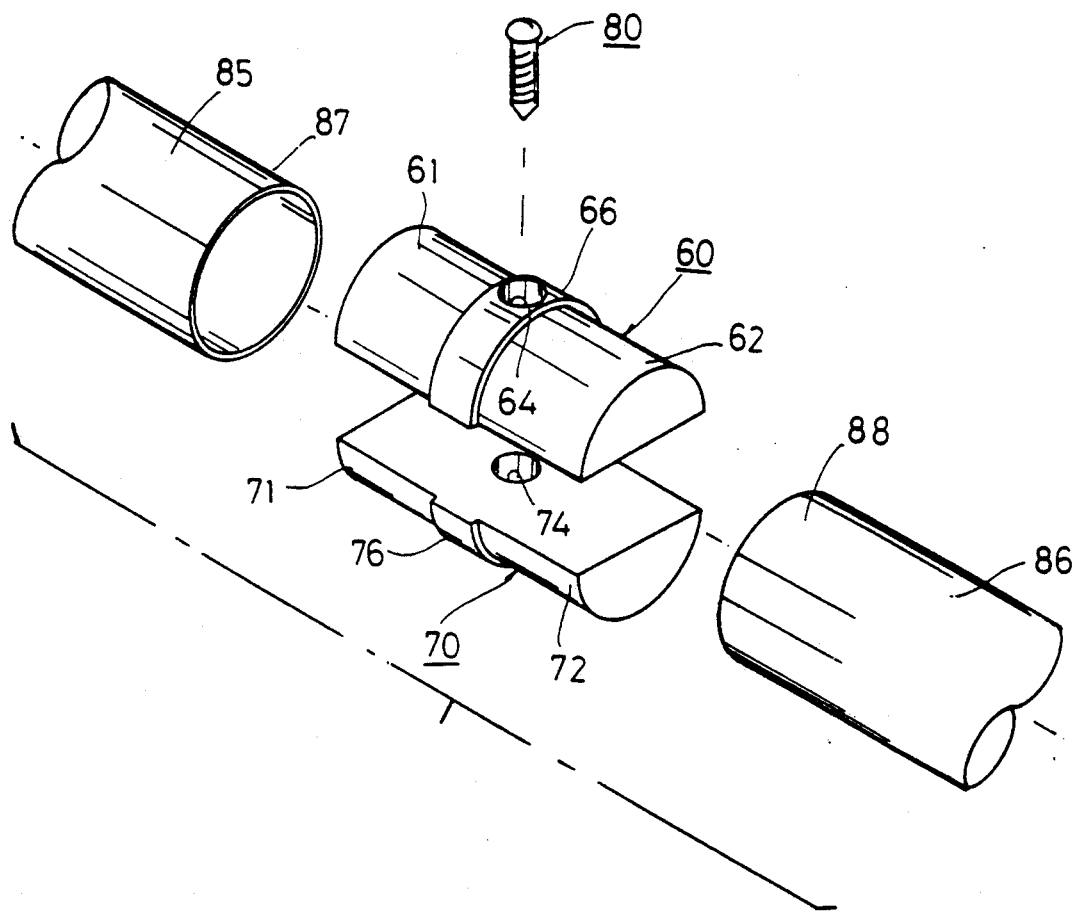
FIG. 6 is a perspective view of the pipe connector according to FIG. 5.
Figure 7:
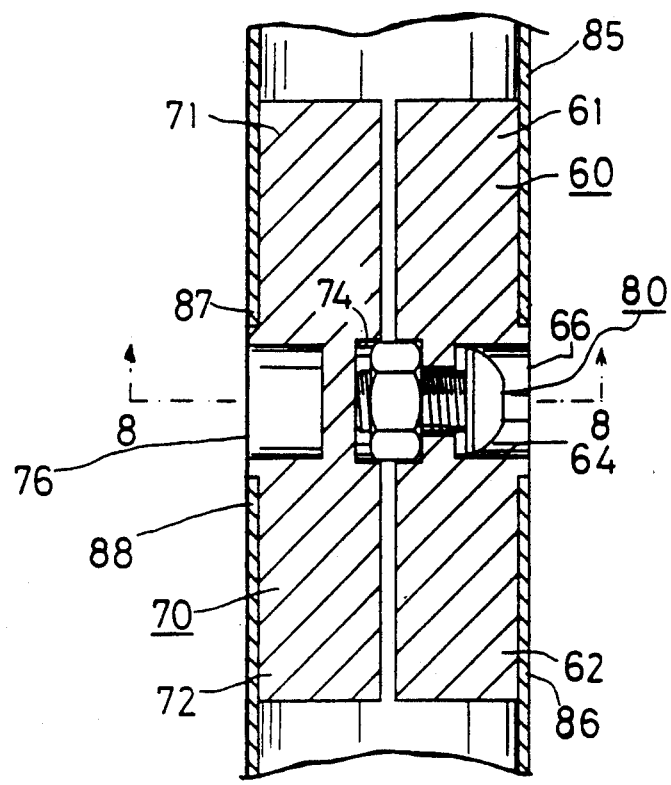
FIG. 7 is a longitudinal cross-sectional view of the assembled connecting structure shown in FIG. 6.
Figure 8:
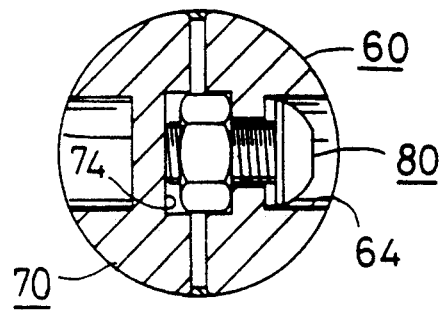
FIG. 8 is a cross-sectional view along line 8—8 in FIG. 7.
Figure 9:
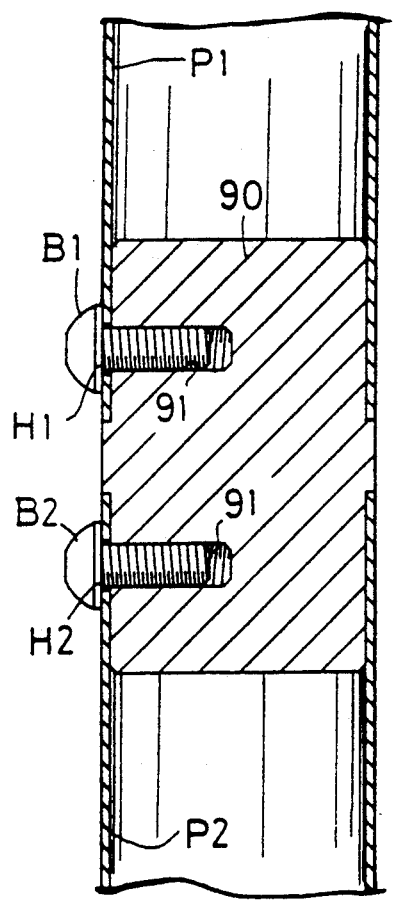
FIG. 9 is a longitudinal cross-sectional view of one embodiment of a conventional pipe connector.
Figure 10:
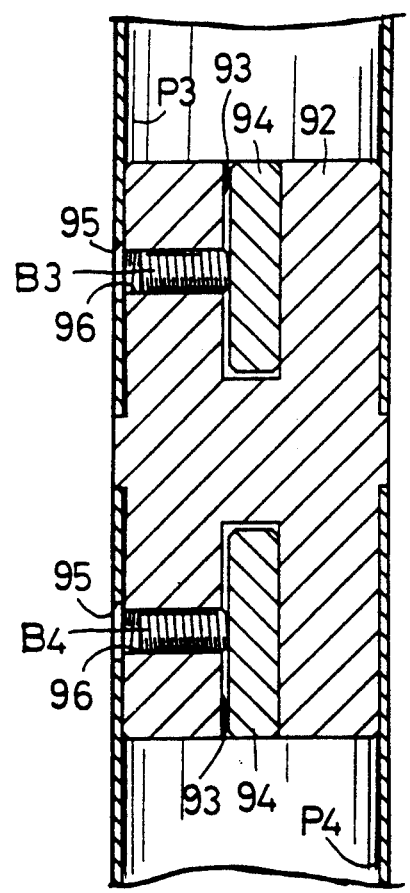
FIG. 10 is a longitudinal cross-sectional view of another embodiment of a conventional pipe connector.

Another embodiment of the invention is shown in FIGS. 6 through 8. The first partial connecting bush 60 has a bolt through hole 64 and a first partial connecting bush radially protruding, partially annular flange 66. A second partial connecting bush 70 has a bolt receiving hole 74 and a respective radially protruding, partially annular flange 76. The tightening bolt 80 presses the first and second partial bushes apart inside the terminal end regions of the pipes 85 and 86. Both of the terminal or end regions 61 and 62 of the first partial connecting bush 60 and both of the terminal or end regions 71 and 72 of the second partial connecting bush 70 are inserted into the respective terminal end regions of the pipes 85 and 86 where the partial bushes and the pipes are connected.

In this example, the bolt through hole 64 of the first partial connecting bush 60 is formed at the center of the partial annular flange 66 and the hole 64 extends radially through the partial flange 66, rather than extending along a chord. A tightening bolt 80 is screwed into the hole 64 to press against the bottom of the aligned hole 74 in the other partial bush 70. In other respects, this embodiment is similar to the first one.

The pipe connector enables pipes to be firmly and securely fixed against external forces, such as bending and twisting. It also enables easy installation and dismantling in a structure which is simple but not easily broken. Furthermore, because the head of the bolt 40 or 80 does not protrude out of the outer peripheral surface of the pipes, the outside appearance of the pipe connector is simple and it can be easily combined with other pipes.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A pipe connector for connecting the terminal end regions of two pipes, wherein the terminal ends of the pipes are open for receiving the pipe connector, the pipe connector comprising:

a first partially circumferential partial bush having opposite first and second axial ends;

a second partially circumferential partial bush disposed next to and abuttable with the first partial bush, the second partial bush also having respective first and second opposite ends at the respective first and second ends of the first partial bush;

the first ends of the first and second partial bushes being installed in the first terminal end region of the first pipe, and the second ends of the first and second partial bushes being installed in the second terminal end region of the second pipe;

each of the first and second partial bushes having a facing abuttable surface, at least one of the facing abuttable surfaces including a protrusion thereon which projects towards the other facing surface, the protrusion maintaining a spacing between the facing abuttable surfaces of the first and second partial bushes; and a tightening bolt extending through the first partial bush and toward the second partial bush and located between both of the first and second pipe terminal end regions and abutting the second partial bush where the second partial bush faces toward the first partial bush, such that tightening of the bolt into the first partial bush presses the bolt against the second partial bush for pushing the first and second partial bushes apart and wherein the first and second end regions of the first and second partial bushes respectively press against the respective interiors of the first and second pipe terminal end regions to hold the pipe connector in the first and second pipe terminal end regions and to connect the first and second pipes by the pipe connector.

2. The connector of claim 1, wherein the tightening bolt is oriented in the first partial bush and with respect to the second partial bush to press the second partial bush in the circumferential direction of the pipes and not merely radially.

3. The connector of claim 2, wherein the bolt is oriented to extend generally non radially and not on a path through the center of the first bush.

4. The connector of claim 3, wherein the partial bushes together are circular and the bolt extends generally along a chord of the circle.

5. The connector of claim 1, wherein the first and second partial bushes are complementary such that together they define a complete circumference inside the terminal end regions of the first and second pipes.

6. The connector of claim 1, wherein there is a respective one of the protrusions at each axial side of the bolt along the connector.

7. The connector of claim 6, wherein each of the protrusions is located along the first and second partial bushes at a location which is inside the respective one of the first and second terminal end regions of the first and second pipes.

8. The connector of claim 7, wherein one of the protrusions is on the facing abut surface of the first partial bush and the other of the protrusions is on the facing abuttable surface of the second partial bush.

9. The connector of claim 1, wherein the bolt extends from the exterior of the first partial bush through the first partial bush and through the facing abuttable surface of the first partial bush, and the first partial bush and the bolt being adapted for providing access to the bolt from the exterior of the first partial bush.

10. The connector of claim 9, further comprising means for holding the bolt to the first partial bush.

11. The connector of claim 10, wherein the holding means comprises a nut generally at the facing abuttable surface of the first partial bush into which the bolt is tightened, and the nut being threaded such that tightening of the bolt into the nut moves the bolt towards the second partial bush.

12. The connector of claim 10, wherein each of the first and second partial bushes has a radially protruding partial annular flange located substantially axially centrally along its length, the flange having a thickness generally corresponding to that of the pipes at the pipe terminal ends regions.

13. The connector of claim 1, wherein each of the first and second partial bushes has a radially protruding partial annular flange located substantially axially centrally along its length, the flange having a thickness generally corresponding to that of the pipes at the pipe terminal end regions.

14. The connector of claim 1, wherein each of the first and the second partial bushes is substantially half cylindrical and together the first and second partial bushes generally define a cylindrical shape.

15. The connector claim of 12, wherein the bolt passes through a chord of the annular flange.

16. The connector of claim 13, wherein the bolt passes through a chord of the annular flange.

* * * * *